US010970574B2

(12) United States Patent
Joshi et al.

(10) Patent No.: US 10,970,574 B2
(45) Date of Patent: Apr. 6, 2021

(54) SPOOF DETECTION USING DUAL-BAND NEAR-INFRARED (NIR) IMAGING

(71) Applicant: Advanced New Technologies Co., Ltd., George Town (KY)

(72) Inventors: Yash Joshi, Kansas City, MO (US); Srikanth Parupati, Framingham, MA (US); Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/269,059

(22) Filed: Feb. 6, 2019

(65) Prior Publication Data

US 2020/0250448 A1    Aug. 6, 2020

(51) Int. Cl.
  *G06K 9/00* (2006.01)
  *A61B 3/14* (2006.01)
  *G06F 21/32* (2013.01)
  *G06K 9/20* (2006.01)

(52) U.S. Cl.
  CPC ......... *G06K 9/00906* (2013.01); *G06F 21/32* (2013.01); *G06K 9/2018* (2013.01)

(58) Field of Classification Search
  USPC ........ 382/100, 103, 106, 115–118, 155, 162, 382/168, 173, 181, 190, 199, 209, 124, 382/219, 232, 254, 274, 276, 285–287, 382/305, 312; 351/203, 206
  See application file for complete search history.

(56) References Cited

U.S. PATENT DOCUMENTS

| | | | |
|---|---|---|---|
| 9,390,327 | B2 | 7/2016 | Gottemukkula et al. |
| 2004/0041997 | A1 | 3/2004 | Uomori et al. |
| 2004/0186363 | A1 | 9/2004 | Smit et al. |
| 2005/0265585 | A1 | 12/2005 | Rowe |
| 2007/0004972 | A1 | 1/2007 | Cole et al. |

(Continued)

OTHER PUBLICATIONS

Sun et al., "TIR/VIS correlation for liveness detection in face recognition," 14th International Conference on Computer Analysis of Images and Patterns, Aug. 2011, 6855:114-121.

(Continued)

*Primary Examiner* — Seyed H Azarian
(74) *Attorney, Agent, or Firm* — Fish & Richardson P.C.

(57) ABSTRACT

This document described a method that includes illuminating a first subject with electromagnetic radiation in a first wavelength range, and capturing a first image of the first subject under illumination of the first wavelength range. The method also includes illuminating the first subject with electromagnetic radiation in a second wavelength range, wherein a difference between (i) absorption of the second wavelength range by live human tissue, and (ii) absorption of the first wavelength range by live human tissue satisfies a threshold condition. The method further includes capturing a second image of the first subject under illumination of the second wavelength range, identifying, based on a difference between the first image and the second image, the first subject as an alternative representation of a live person, and preventing access to the secure system responsive to identifying the first subject as an alternative representation of a live person.

18 Claims, 6 Drawing Sheets

(56) References Cited

U.S. PATENT DOCUMENTS

| | | |
|---|---|---|
| 2008/0025579 A1* | 1/2008 | Sidlauskas ........... G06K 9/0004 382/124 |
| 2016/0267339 A1 | 9/2016 | Nakano et al. |
| 2016/0335483 A1 | 11/2016 | Pfursich et al. |
| 2016/0371555 A1 | 12/2016 | Derakhshani et al. |
| 2017/0124374 A1* | 5/2017 | Rowe ................. G06K 9/00053 |
| 2017/0286788 A1 | 10/2017 | Fan et al. |
| 2017/0325721 A1 | 11/2017 | Matsuda et al. |
| 2017/0344793 A1* | 11/2017 | Xue ................... G06K 9/00906 |
| 2018/0053044 A1 | 2/2018 | Su et al. |
| 2018/0165512 A1 | 6/2018 | Fan |
| 2018/0181794 A1 | 6/2018 | Benini et al. |
| 2018/0247142 A1 | 8/2018 | Oda et al. |
| 2018/0285668 A1* | 10/2018 | Li ........................ G06K 9/6269 |
| 2018/0349721 A1 | 12/2018 | Agrawal et al. |
| 2019/0025672 A1 | 1/2019 | Van Der Sijde et al. |
| 2019/0068367 A1 | 2/2019 | Baughman et al. |
| 2019/0278974 A1 | 9/2019 | Lubin et al. |
| 2020/0104567 A1 | 4/2020 | Tajbakhsh et al. |
| 2020/0134242 A1 | 4/2020 | Parupati et al. |
| 2020/0134344 A1 | 4/2020 | Joshi et al. |
| 2020/0134345 A1* | 4/2020 | Joshi ................. G06K 9/00906 |
| 2020/0210738 A1 | 7/2020 | Parupati et al. |

OTHER PUBLICATIONS

Zanuttigh et al., "Operating Principles of Structured Light Depth Cameras," Time-of-Flight and Structured Light Depth Cameras, Springer International Publishing, 2016, Chapter 2, DOI: 10.1007/978-3-319-30973-6_2, pp. 43-79.

PCT International Search Report and Written Opinion in International Application No. PCT/US2019/058125, dated Feb. 5, 2020, 11 pages.

U.S. Appl. No. 16/171,029, filed Oct. 25, 2018, Joshi et al.

* cited by examiner

SPOOF DETECTION USING DUAL-BAND NEAR-INFRARED (NIR) IMAGING

TECHNICAL FIELD

This disclosure relates to image capture devices.

BACKGROUND

Systems incorporating a biometric identification technology such as face recognition or iris recognition often include a camera that captures an image of a user. The captured image is then processed to authenticate the user using the biometric identification technology.

SUMMARY

In one aspect, this document describes a method for preventing access to a secure system based on determining that a subject is an alternative representation of a live person. The method includes illuminating a first subject with electromagnetic radiation in a first wavelength range, and capturing a first image of the first subject under illumination of the first wavelength range. The method also includes illuminating the first subject with electromagnetic radiation in a second wavelength range, wherein a difference between (i) absorption of the second wavelength range by live human tissue, and (ii) absorption of the first wavelength range by live human tissue satisfies a threshold condition. The method further includes capturing a second image of the first subject under illumination of the second wavelength range, identifying, based on a difference between the first image and the second image, the first subject as an alternative representation of a live person, and preventing access to the secure system responsive to identifying the first subject as an alternative representation of a live person.

In another aspect, this document describes a secure system that includes secure system that includes one or more illumination sources, one or more image acquisition devices, and an image analysis engine that includes one or more processing devices. The one or more illumination sources illuminate a first subject with electromagnetic radiation in a first wavelength range during a first time period, and with electromagnetic radiation in a second wavelength range during a second time period. A difference between (i) absorption of the second wavelength range by live human tissue, and (ii) absorption of the first wavelength range by live human tissue satisfies a threshold condition. The one or more image acquisition devices capture a first image of the first subject under illumination of the first wavelength range, and a second image of the first subject under illumination of the second wavelength range, and the an image analysis is programmed to identify based on a difference between the first image and the second image, the first subject as an alternative representation of a live person, and prevent access to the secure system responsive to identifying the first subject as an alternative representation of a live person.

In another aspect, this document describes one or more machine-readable storage devices encoded with instructions configured to cause one or more processing devices to execute various operations. The operations include causing one or more light source arrays to illuminate a first subject with electromagnetic radiation in a first wavelength range, and receiving a first image of the first subject captured under illumination of the first wavelength range. The operations also include causing the one or more light source arrays to illuminate the first subject with electromagnetic radiation in a second wavelength range, wherein a difference between (i) absorption of the second wavelength range by live human tissue, and (ii) absorption of the first wavelength range by live human tissue satisfies a threshold condition. The operations also include receiving a second image of the first subject captured under illumination of the second wavelength range, identifying, based on a difference between the first image and the second image, the first subject as an alternative representation of a live person, and preventing access to a secure system responsive to identifying the first subject as an alternative representation of a live person.

Implementations of the above aspects can include one or more of the following features. The alternative representation of a live person can include a photograph of the live person. The photograph can be printed on paper, or presented on a display device. The first wavelength range can include 940 nm. The second wavelength range can include 850 nm. The threshold condition can be satisfied if a variation between (i) the absorption of the second wavelength range by live human tissue, and (ii) the absorption of the first wavelength range by live human tissue, is more than 40%. Computing the difference between the first image and the second image can include determining pixel-wise differences in intensity values between corresponding pixels of the first image and the second image, and determining the difference between the first image and the second image as an average of the pixel-wise differences. Identifying the first subject as the alternative representation can include determining that the difference between the first image and the second image is less than a target value, and responsive to determining that the difference between the first image and the second image is less than the target value, identifying the first subject as the alternative representation. Identifying the first subject as the alternative representation can include processing the first image and the second image using a machine learning process trained to discriminate between images of live persons and corresponding alternative representations of the live persons. A second subject can be illuminated with electromagnetic radiation using the first wavelength range, and a third image of the second subject can be captured under illumination of the first wavelength range. The second subject can be illuminated with electromagnetic radiation using the second wavelength range, and a fourth image of the second subject can be captured under illumination of the second wavelength range. Based on a difference between the third image and the fourth image, the second subject can be identified as a live person, and in response, an authentication process can be initiated for determining if the live person is authorized to access the secure system. The secure system can include a user-interface disposed in a kiosk.

Various implementations described herein may provide one or more of the following advantages. Reliability and/or security of a biometric authentication system can be improved by allowing the system to discriminate between live persons and alternative representations such as photographs displayed on paper or display devices. By allowing a biometric authentication system to discriminate between an image of a live person and an image of a spoof alternative representation, additional processing can be preemptively terminated, thereby creating an additional layer of security. In some cases, where a camera and frequency-tunable light sources are used for obtaining high quality biometric images (e.g., an eye-print), the technology described herein allows for implementing a spoof detection system while reducing requirements for additional hardware. This in turn in some cases, can reduce costs associated with the underlying biometric authentication system.

Repeat use of reference characters in the present specification and drawings is intended to represent same or analogous features or elements.

DETAILED DESCRIPTION

This document presents an image analysis method in which an image captured using an image acquisition device of a biometric authentication system is analyzed to determine if the image corresponds to an actual live person, or to an alternative representation (e.g., a photograph or other image of the live person printed on paper, or displayed on a high definition display device) of the live person. Specifically, this document describes technology in which a subject is imaged under at least two separate wavelength ranges such that the absorption/reflection characteristics of live tissues under the corresponding wavelength ranges differ by at least a threshold amount. Spoof alternative representations such as photographs do not exhibit such differential characteristics, and this property can be used to discriminate between live subjects and spoof alternative representations. If the captured image is not determined to correspond to a live person, any further processing of the captured image by the biometric authentication system can be stopped, and any corresponding access attempt can be prevented immediately. Many biometric authentication systems involve authenticating a user to a secure system based on recognizing the user's face, eye-print, iris etc. Such biometric authentication systems involve capturing one or more images of a user, and executing corresponding recognition processes on the captured image. Malicious attempts to breach the security of such biometric authentication systems can include presenting an alternative representation of a live person to gain access to an account or other privileges associated with the identity of the corresponding live person. Such attacks are generally known as spoof attacks, and the reliability/security of a biometric authentication system can be determined by the ability of the system to differentiate between a live person and corresponding alternative representations (also referred to as spoofs). The technology described herein improves security/reliability of biometric authentication systems that rely on recognizing a user based on face recognition, eye-print recognition, iris recognition etc. Specifically, this document describes preprocessing steps that allow for determining whether the captured image corresponds to an actual live person or a spoof alternative representation such as a printed or displayed image/photograph of the live person. Upon detecting that the captured image is a spoof, any further processing of the image to allow access to the corresponding secure system can be prevented, thereby adding an added layer of security to the system.

Figure 1:
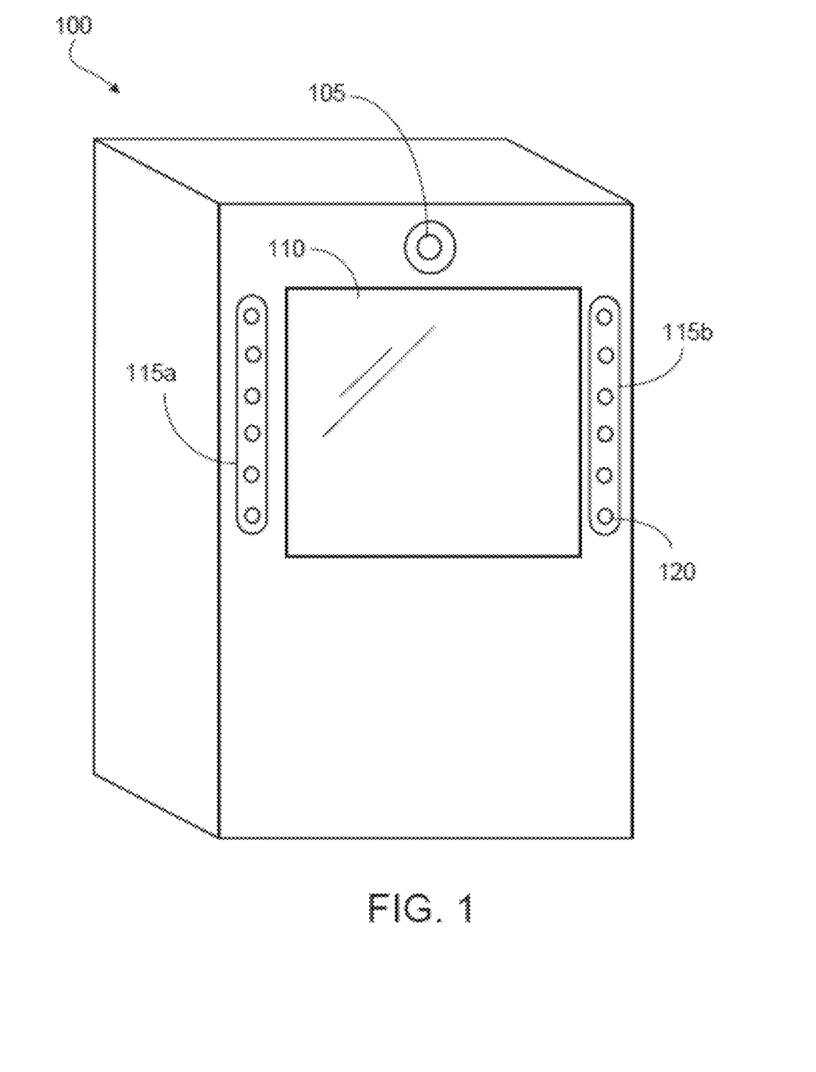
FIG. 1 shows a kiosk device as an example environment in which the technology described herein may be used.

FIG. 1 shows a kiosk device 100 as an example environment in which the technology described herein may be used. Such kiosk devices may be used for various purposes that require authenticating users via one or more biometric authentication processes. For example, the kiosk 100 can include an automated teller machine (ATM) that allows a user to withdraw money from a bank account. In another example, the kiosk 100 may be deployed at a restaurant or a fast-food outlet, and allow a user to order and pay for food. The kiosk 100 may also be deployed at an entry point (e.g., at the gate of an arena or stadium) to authenticate entrants prior to entering the venue. In general, the kiosk 100 may be deployed at various types of locations to authenticate users interactively, or even without any active participation of the user.

In some implementations, the kiosk 100 can include one or more components that support a biometric authentication system. For example, the kiosk 100 can include one or more image acquisition devices, such as a camera 105, which captures images of users interacting with the kiosk 100. The captured images may be processed to identify/authenticate valid users, and/or permit or deny access to the services/products being offered through the kiosk. For example, the kiosk 100 may include a display device 110 (e.g., a capacitive touch screen) that allows a user to select and order food at a retail outlet. Once the user completes the selection via user-interfaces presented on the display device 110, the user may be asked to look towards the camera 105 for authentication. The images captured using the camera 105 may then be used to authenticate/identify/verify a pre-stored profile for the user, and the payment for the food may then be automatically deducted from an account linked to the profile.

In some implementations, the images captured using the camera 105 can be processed using an underlying biometric authentication system to identify/verify the user. In some implementations, the biometric authentication system may extract from the images, various features—such as features derived from the face, iris, vasculature underlying the sclera of the eye, or the periocular region—to identify/authenticate a particular user based on matching the extracted features to that of one or more template images stored for the user during an enrollment process. The biometric authentication system may use a machine-learning process (e.g., a deep learning process implemented, for example, using a deep neural network architecture) to match the user to one of the many templates stored for various users of the system. In some implementations, the machine learning process may be implemented, at least in part, using one or more processing devices deployed on the kiosk 100. In some implementations, the kiosk 100 may communicate with one or more remote processing devices (e.g., one or more remote servers) that implement the machine learning process.

In some implementations, the images captured using the camera 105 are used to authenticate/identify/verify a user, and provide access to accounts/privileges associated with the identity of the user. For example, one or more images captured by the camera 105 can be analyzed to recognize a user (e.g., using face recognition, eye-print recognition, iris recognition etc.) using a corresponding underlying biometric authentication process. However, malicious attempts to breach the security of such biometric authentication processes often involve presentation of an alternative representation of a live person (e.g., photograph or other image of the live person printed on paper, or displayed on a high definition display device) in an attempt to cause the underlying biometric authentication system to identify the alternative representation as the corresponding live person. Therefore, in many cases, the security and/or reliability of the underlying biometric authentication system depends on the ability of the system to discriminate between actual live persons and spoof alternative representations such as printed photographs or images displayed on display devices. The technology described herein allows for improving the discrimination capabilities of biometric authentication systems, thereby improving reliability/security of the systems.

In some implementations, the kiosk 100 can include one or more illumination sources 115a and 115b (115, in general) configured to generate electromagnetic radiation for illuminating the subject of the images being captured by the camera 105. For example, the illumination sources 115 can each include a light source array that includes one or more light sources 120 (e.g., light emitting diodes (LEDs), laser sources, etc.) that are arranged in a particular pattern. In the example of FIG. 1, each illumination source 115 includes a light source array light sources 120 arranged in a row. However, the light sources or LEDs may be arranged in various other patterns including, for example, patterns of concentric circles. In some implementations, a light source 115 can include a projector having a pattern of point light sources such as laser sources or other sources capable of producing narrow beams of light. While FIG. 1 shows two spatially separated light sources 115a and 115b, a single light source 115 may also be used.

Figure 2:
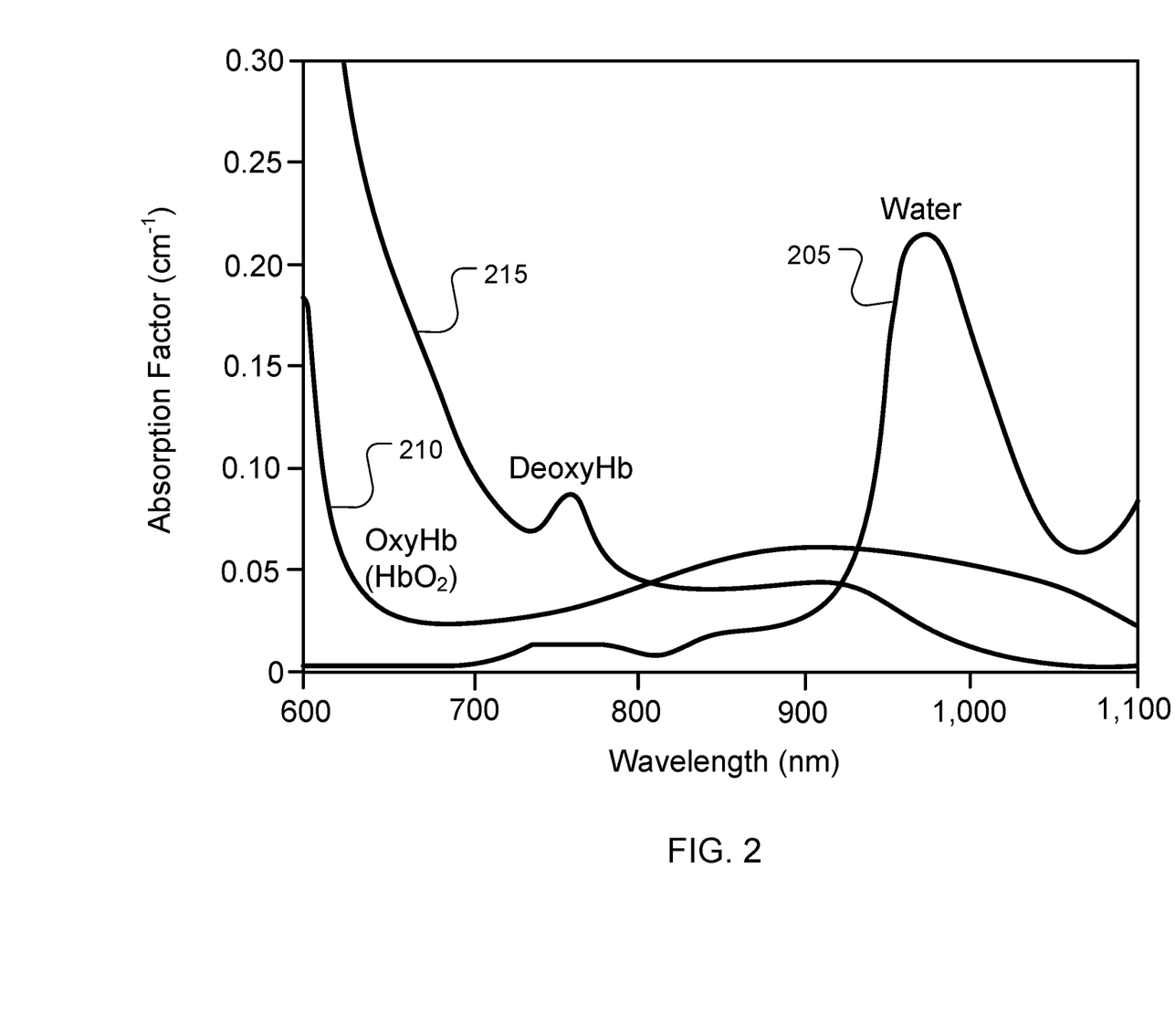
FIG. 2 is a set of plots illustrating representative absorption characteristics of various components of live human tissues.

In some implementations, the illumination sources 115 can be controlled to radiate electromagnetic radiation in multiple wavelength ranges, and the differences between the corresponding images can be analyzed to determine whether the subject is a live human being or a spoof alternative representation thereof. The difference in the images can be attributed to, for example, differential absorption characteristics of human tissues at the corresponding wavelengths. The absorption characteristics of human tissues can be governed by one or more components of the tissues. For example, often the absorption characteristics are found to be most affected by water and hemoglobin content of the tissues. FIG. 2 shows a set of plots that show representative absorption characteristics for water (plot 205), oxygenated hemoglobin (plot 210), and deoxygenated hemoglobin (plot 215). As seen from the plots, because of the combined absorption characteristics of water, oxygenated hemoglobin, and deoxygenated hemoglobin, absorption of human tissues increases significantly around 940 nm, and is relatively much less in the 800-850 nm range. Therefore if a live tissue is imaged under illumination in a first wavelength range that includes 940 nm, and also under illumination in a second wavelength range that corresponds to a significantly lower absorption, the corresponding images would be significantly different. For example, an image captured under illumination of around 940 nm would appear dark due to the high absorption, and an image captured under illumination in the 800-850 nm range would be relatively brighter due to the low absorption in that range. On the other hand, corresponding images of a spoof alternative representation (e.g., a photograph printed on paper, or displayed on a display device, or a mask) would not exhibit such differences when imaged under the different illuminations wavelength ranges. For example, the differences between a first image of a spoof alternative representation illuminated at 940 nm and a second image of the spoof alternative representation illuminated at 850 nm would be significantly less than the corresponding differences for a live human being. This property can be leveraged to quickly determine whether the subject of a set of images is a live human being or a spoof. Such quick determination at the front end of an authentication process can be used to reduce redundant processing (e.g., on an image that is of a spoof alternative representation), which in turn can improve the efficiency of the underlying biometric authentication process.

In some implementations, the wavelengths (or wavelength ranges) corresponding to the first image and the second images can be selected based on particular criteria. In some implementations, the first wavelength (or wavelength range) can be selected based on absorption characteristics of the human tissues expected to be imaged. For example, for facial images, the first wavelength can be selected to be about 940 nm as the absorption of such NIR energy is significantly high (primarily due to the high absorption of water at around that wavelength). In some implementations, a wavelength range including the selected wavelength (e.g., 930-950 nm) can be selected to account for variations in absorption characteristics across subjects. The second wavelength (or wavelength range) can be selected, for example, such that a difference between the absorption of the second wavelength range by live human tissue, and the absorption of the first wavelength range by live human tissue satisfies a threshold condition. In some cases, the threshold condition can be deemed to be satisfied if a variation between the absorption of the second wavelength range by live human tissue, and the absorption of the first wavelength range by live human tissue is more than about 40%. In some implementations, the threshold condition can be determined empirically, such that a target difference between the first and second images is likely for live human tissues. For example, for facial images, the wavelength 850 nm (or a wavelength range including 850 nm) can be selected to achieve detectable differences of the corresponding images with those captured under a 940 nm illumination. In some implementations, computing the difference between the first image and the second image can include determining pixel-wise differences in intensity values between corresponding pixels of the first image (e.g., the image captured under illumination of the first wavelength range) and the second image (e.g., the image captured under illumination of the second wavelength range), and determining the difference between the first image and the second image as an average of the pixel-wise differences. If the determined difference is less than a target value (which may be determined, for example, empirically or via a machine learning process trained on representative training data), the two images can be determined as substantially similar to one another, which is not expected for images of live human tissues. Accordingly, the subject of the images can be determined as a spoof alternative representation of a human being, and further processing of the images to grant access can be terminated immediately. On the other hand, if the difference between the images is higher than the target value, the subject in the image can be identified as a live person, and an authentication process can be initiated to determine if the live person is authorized to access the underlying secure system.

In some implementations, the illumination sources 115 are configured to illuminate the subject with a corresponding pattern of illumination. The pattern of illumination can be referred to as structured light, and configured to introduce high frequency components into images that do not correspond to that of a live person. The skin of a live person scatters and absorbs light incident on it. Therefore, even when structured light, such as that radiated by a pattern of LEDs, is incident on human skin, the light is scattered internally and reflected as diffused light such that a representation of the pattern is not easily detected in an image of the live person captured by the camera 105. On the other hand, if the camera 105 captures an image of a photograph of the person printed on paper, a representation of the pattern may be detectable in the image, for example, due to specular reflection and/or lack of scattering and diffusion. In some implementations, these differences can also be leveraged to discriminate between images of live persons and images of alternative representations of live persons using the technology described herein. Spoof detection using such structured lights is described in additional detail in U.S. application Ser. No. 16/171,029, filed on Oct. 25, 2018, the entire content of which is incorporated herein by reference.

In some implementations, an accuracy of spoof detection in different environment conditions (e.g., outdoor (rainy, sunlight), indoor) can be improved using one or more additional techniques such as live camera pipeline control and distance based infrared illumination control. Using live camera pipeline control techniques, camera pipeline parameters (such as gain, exposure, etc.) may be tuned in real time, for example, based on an amount of infrared radiation in the environment. For example, on a sunny day, when the IR radiation is high, the camera gain can be increased and/or the exposure time can be decreased to obtain images well suited for the spoof detection analysis described herein. Other environmental categories that can be determined based on measuring infrared/near infrared radiation include, for example, indoor, indoor with partial sunlight, outdoor rainy day, outdoor sunny day etc. Predetermined camera parameters suited for capturing images in corresponding situations can be used accordingly.

In some implementations, the quality of the acquired images can be improved using distance based infrared illumination control. Quantum efficiency of CMOS camera sensors in near infrared spectrum is around 25%-35%. At constant IR illumination, near infrared response diminishes as user moves away from camera. Using low power IR illumination may not therefore be effective in obtaining good quality images suitable for the spoof detection technology described herein, particularly for users at a significant distance away from the camera. On the other hand, using high power illumination uniformly can be uncomfortable for users close to the camera. In some implementations, this can be addressed, by adjusting the intensity of the IR illumination based on the distance of a user from the image acquisition device. For example, the distance of a user from the image acquisition device can be measured, and the power of the IR illumination source can be adjusted accordingly.

Figure 3:
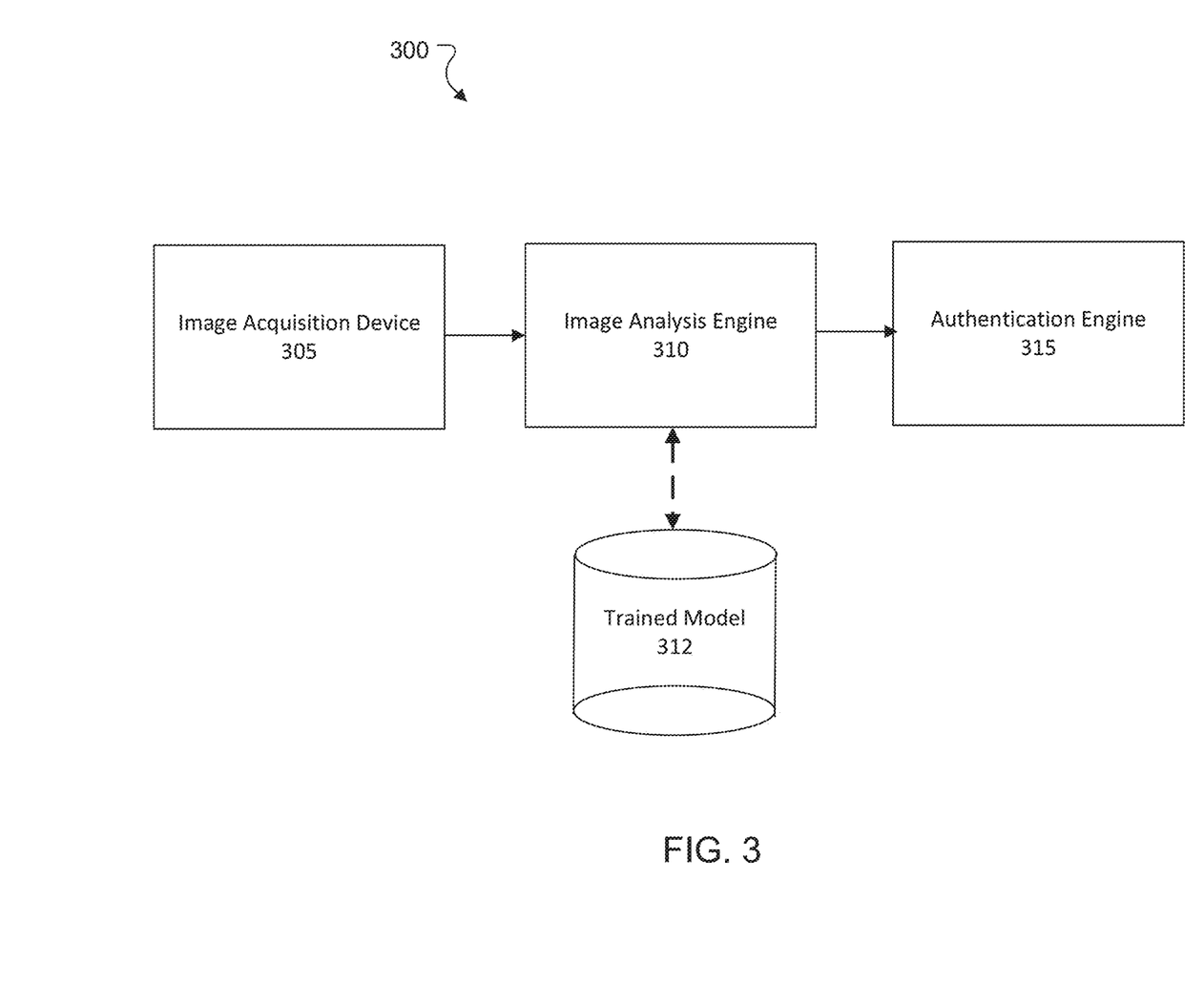
FIG. 3 is a block diagram of an example system usable for implementing the technology described herein.

FIG. 3 shows an example system 300 for analyzing images captured under structured light illumination to determine if the images are of live persons or spoof alternatives of live persons. The system 300 includes an image acquisition device 305 configured capture images of subjects. In some implementations, the image acquisition device 305 includes a camera substantially similar to the camera 105 described with reference to FIG. 1. The image acquisition device 305 can also include a wavelength-tunable light source, and/or a structured light source such as a light source array including multiple light sources disposed in a particular pattern. In some implementations, the light source associated with the image acquisition device 305 can be substantially similar to the illumination sources 115 described above with reference to FIG. 1. Other light sources generating structured light can also be used. In some implementations, the image acquisition device 305 includes an IR/NIR camera and one or more IR/NIR light source array configured to illuminate a subject during image capture by the camera. In some implementations, the image acquisition device includes one or more processing devices configured to generate digital data from the captured images.

The system 300 also includes an image analysis engine 310 that can be configured to analyze images captured by the image acquisition device 305. In some implementations, the image analysis engine 310 is configured to receive digital representations of images captured by the image acquisition device 305 and determine whether or not the images correspond to that of a live person. In some implementations, the image analysis engine 310 includes an analog to digital converter (ADC) to generate digital image data from information (e.g., sensor output) received from the image acquisition device 305. The image analysis engine includes one or more processing devices configured to execute various image analysis processes, including the processes described herein.

In some implementations, the image analysis engine 310 may reside on a computing device (e.g., a server) that is at a remote location with respect to the image acquisition device and/or the authentication engine 315. For example, the image acquisition device 305 can be disposed at a kiosk 100 that communicates over a network with a remote server on which the image analysis engine 310 executes. The image analysis engine 310 can in turn provide an output of the analysis to the authentication engine 315 residing on the kiosk 100. In some implementations, the authentication engine 315 can also reside on a remote server (e.g., the same server one which the image analysis engine 310 resides, or on a different server) and communicate the result of an authentication process to the kiosk 100.

The image analysis engine 310 can be configured to analyze the captured images in various ways, in order to determine whether or not the captured images correspond to a live person. For example, the image analysis engine can be configured to process images captured under different wavelength ranges, and determine whether the subject in the images correspond to live human beings or not (as described throughout this application). In some implementations, the image analysis engine 310 can be configured to execute a machine learning process to discriminate between images of a live person and images of alternative representations of live persons. In such cases, the image analysis engine can access a trained model 312, which has been trained using a learning corpus that includes both types of images. In some implementations, using a machine learning process may improve the performance of the image analysis engine 310 by reducing the false positive rate and/or the false negative rate. In some implementations, the trained model 312 can be trained to account for spoofs presented on various types of papers and display devices.

Figure 4A:
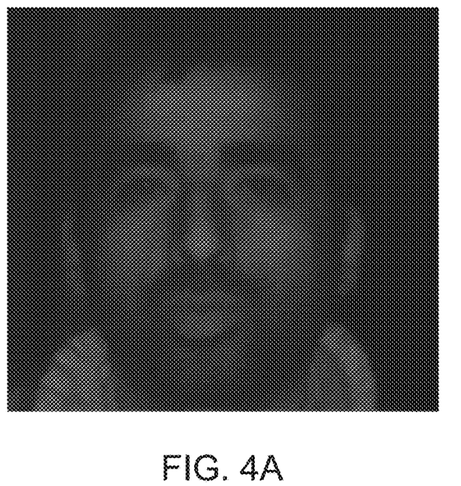
FIGS. 4A-4D show image pairs captured under two different wavelength ranges for a live human being and a spoof alternative representation, respectively.
Figure 4B:
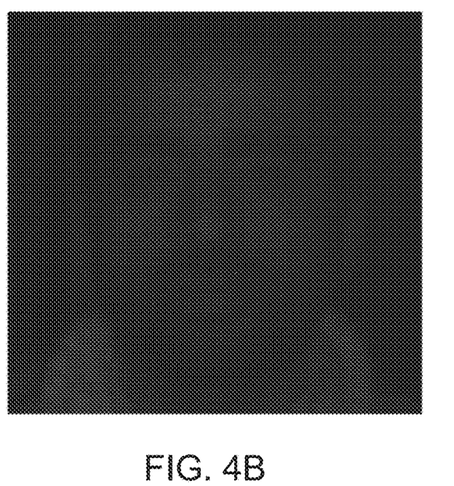
Figure 4C:
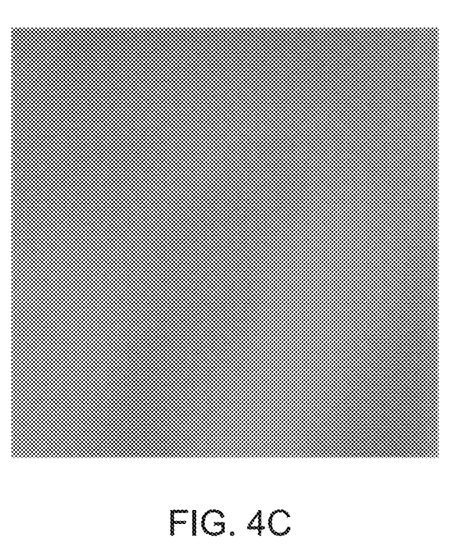
Figure 4D:
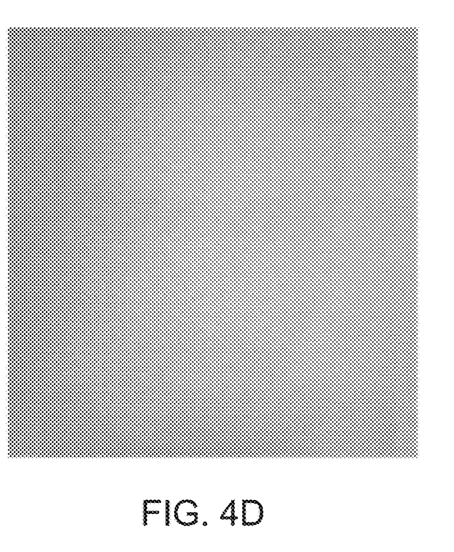

FIGS. 4A and 4B show image pairs captured under two different wavelength ranges for a live human being and a spoof alternative representation, respectively. Specifically, FIGS. 4A and 4B show images of a live human captured under 850 nm and 940 nm illumination, respectively. FIGS. 4C and 4D on the other hand show images of a spoof alternative representation (a photograph printed on paper) of a human being under the same 850 nm and 940 nm illumination, respectively. As seen from the image pair in FIGS. 4A and 4B, the difference in captured images are significant. However, for the photograph printed on paper, the difference between the two images in the corresponding image pair (shown in FIGS. 4C and 4D) are negligible. This lack of difference in the images captured under the two different illumination wavelengths can be leveraged to identify the subject of the images in FIGS. 4C and 4D to be that of a spoof alternative representation.

Figure 5:
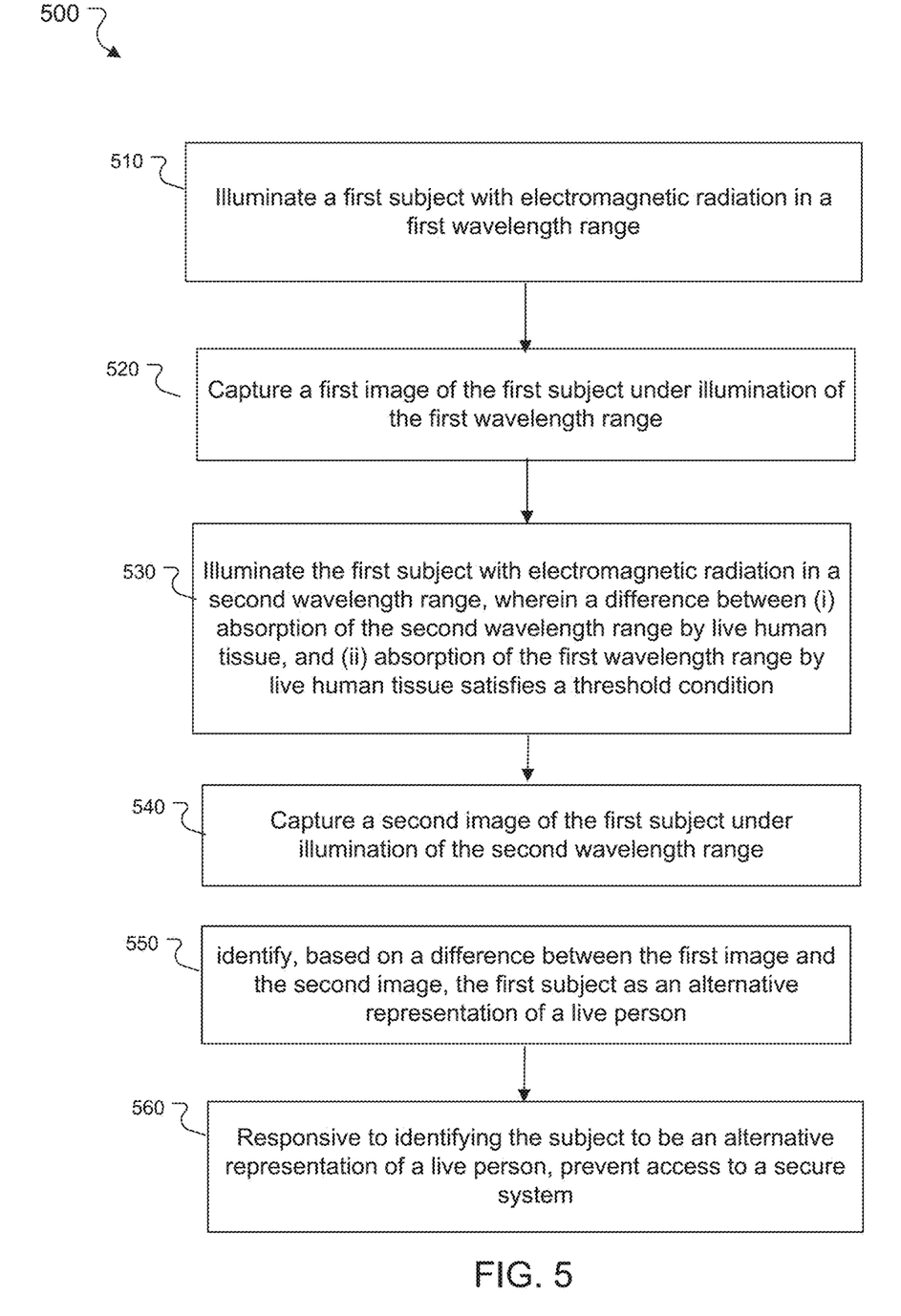
FIG. 5 is a flowchart of an example process for preventing access to a secure system based on determining a captured image to be of an alternative representation of a live person.

FIG. 5 is a flowchart of an example process for preventing access to a secure system based on determining a captured image to be of an alternative representation of a live person. In some implementations, at least a portion of the process 400 may be executed by one or more processing devices disposed within a kiosk such as the kiosk 100 described with reference to FIG. 1. In some implementations, at least a portion of the process 400 may be executed by the image analysis engine 310, which may be disposed within a kiosk, or at one or more servers (such as servers or computing devices in a distributed computing system) in communication with remote components such as one or more processing devices disposed within a kiosk.

Operations of the process 500 includes illuminating a first subject with electromagnetic radiation in a first wavelength range (510). The light source array can be disposed, for example, as a part of the illumination source 115 as described above with reference to FIG. 1. In some implementations, the light source array can be disposed in another device such as a smartphone, wherein the spoof detection process described herein is used to prevent unauthorized access to the smartphone. In some implementations, the light source array is configured to radiate IR/NIR illumination (e.g., in the 700-1000 nm range). In some implementations, illumination in the first wavelength range includes illumination at 950 nm.

Operations of the process 500 also includes capturing a first image of the first subject under illumination of the first wavelength range (520). In some implementations, the image can be captured using an image acquisition device substantially similar to the image acquisition device 305 described above with reference to FIG. 3. In some implementations, the image acquisition device can be disposed as a part of a kiosk 100 as described above with reference to FIG. 1. In some implementations, the image acquisition device can be disposed in a smartphone.

Operations of the process 500 further includes illuminating the first subject with electromagnetic radiation in a second wavelength range (530), and capturing a second image of the first subject under illumination of the second wavelength range (540). The second wavelength is such that a difference between absorption of the second wavelength range by live human tissue, and absorption of the first wavelength range by live human tissue satisfies a threshold condition. For example, illumination in the second wavelength can include illumination at 850 nm. In some implementations, the threshold condition is deemed to be satisfied if a variation between the absorption of the second wavelength range by live human tissue, and the absorption of the first wavelength range by live human tissue, is more than 40%. The absorption can be measured, for example, in an amount of energy absorbed per unit area.

Operations of the process 500 further includes identifying, based on a difference between the first image and the second image, the first subject as an alternative representation of a live person (550). The alternative representation of a live person can include a photograph of the live person. The photograph can be printed on paper, or displayed on a display device such as the screen of a mobile device. In some implementations, the alternative representation can include a mask. Computing the difference between the first image and the second image can include, for example, determining pixel-wise differences in intensity values between corresponding pixels of the first image and the second image, and determining the difference between the first image and the second image as an average of the pixel-wise differences. In some implementations, if the difference between the first image and the second image is less than a target value, the first subject is identified as a spoof alternative representation of a live person. In some implementations, identifying the first subject as the alternative representation includes processing the first image and the second image using a machine learning process trained to discriminate between images of live persons and corresponding alternative representations of the live persons.

Operations of the process 500 also includes preventing, responsive to identifying the subject in the image to be an alternative representation of a live person, access to the secure system (560). In some implementations, where a user-interface of the secure system is disposed as a part of a kiosk, identifying a captured image to be a spoof can prevent an access attempt made through the kiosk. On the other hand, if a determination is made that the subject in the image is a live person, an authentication process for determining if the live person is authorized to access the secure system is initiated. This can be done, for example, using an authentication system substantially similar to the authentication engine 315 described above with reference to FIG. 3. If such an authentication engine authenticates the live person to access the secure system (e.g., a user account or privileges associated with the access attempt), the live person is allowed to continue the interaction with the corresponding user interface (e.g., a kiosk or a smartphone).

Figure 6:
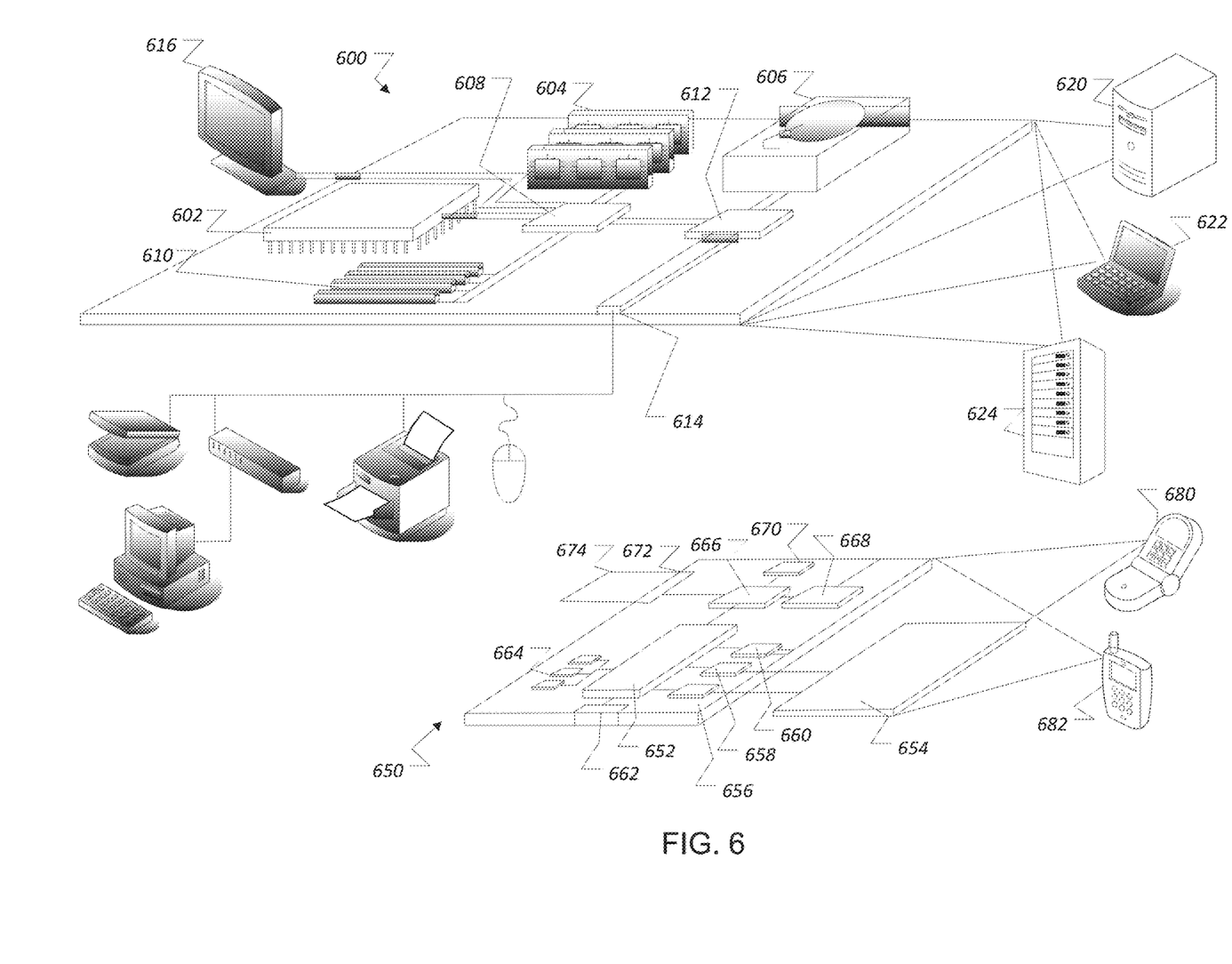
FIG. 6 is a block diagram representing examples of computing devices.

FIG. 6 shows an example of a computing device 600 and a mobile device 650, which may be used with the techniques described here. For example, referring to FIG. 1, the kiosk device 100 can include one or more of the computing device 600 or the mobile device 650, either in part or in its entirety. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. The components shown here, their connections and relationships, and their functions, are meant to be examples only, and are not meant to limit implementations of the techniques described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, memory on processor 602, or a propagated signal.

The high speed controller 608 manages bandwidth-intensive operations for the computing device 600, while the low speed controller 612 manages lower bandwidth-intensive operations. Such allocation of functions is an example only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, so as to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650, or may also store applications or other information for device 650. Specifically, expansion memory 674 may include instructions to carry out or supplement the processes described above, and may include secure information also. Thus, for example, expansion memory 674 may be provide as a security module for device 650, and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, memory on processor 652, or a propagated signal that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, WiFi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, and so forth) and may also include sound generated by applications operating on device 650.

The computing device 650 may be implemented in a number of different forms, as shown in the figure. For example, it may be implemented as a cellular telephone 680. It may also be implemented as part of a smartphone 682, personal digital assistant, tablet computer, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications may be made without departing from the scope of the inventive concepts described herein, and, accordingly, other implementations are within the scope of the following claims.

What is claimed is:

1. A method for preventing access to a secure system based on determining that a subject is an alternative representation of a live person, the method comprising:
    illuminating a first subject with electromagnetic radiation in a first wavelength range;
    capturing a first image of the first subject under illumination of the first wavelength range;
    illuminating the first subject with electromagnetic radiation in a second wavelength range, wherein a difference between (i) absorption of the second wavelength range by live human tissue, and (ii) absorption of the first wavelength range by live human tissue satisfies a threshold condition;
    capturing a second image of the first subject under illumination of the second wavelength range;
    calculating pixel-wise differences in intensity values between corresponding pixels of the first image and the second image;
    calculating an aggregated measure of the pixel-wise differences in intensity values;
    calculating a difference between the aggregated measure of the pixel-wise differences and a target value; and
    identifying, based at least on the difference between the aggregated measure and the target value, the first subject as an alternative representation of a live person; and
    preventing access to the secure system responsive to identifying the first subject as an alternative representation of a live person.

2. The method of claim 1, wherein the alternative representation of a live person comprises a photograph of the live person.

3. The method of claim 2, wherein the photograph is printed on paper or presented on a display device.

4. The method of claim 1, wherein the first wavelength range includes 940 nm, and the second wavelength range includes 850 nm.

5. The method of claim 1, wherein the threshold condition is satisfied if a variation between (i) the absorption of the second wavelength range by live human tissue, and (ii) the absorption of the first wavelength range by live human tissue, is more than 40%.

6. The method of claim 1, wherein the aggregated measure of the pixel-wise differences in intensity values comprises an average of the pixel-wise differences in intensity values.

7. The method of claim 1, wherein identifying the first subject as the alternative representation comprises processing the first image and the second image using a machine learning process trained to discriminate between images of live persons and corresponding alternative representations of the live persons.

8. The method of claim 1, further comprising:
    illuminating a second subject with electromagnetic radiation using the first wavelength range;
    capturing a third image of the second subject under illumination of the first wavelength range;
    illuminating the second subject with electromagnetic radiation using the second wavelength range;

capturing a fourth image of the second subject under illumination of the second wavelength range;

identifying, based on a difference between the third image and the fourth image, the second subject as a live person; and responsive to identifying the second subject as a live person, initiating an authentication process for determining if the live person is authorized to access the secure system.

9. A secure system comprising:

one or more illumination sources that illuminate a first subject with electromagnetic radiation in a first wavelength range during a first time period, and with electromagnetic radiation in a second wavelength range during a second time period, wherein a difference between (i) absorption of the second wavelength range by live human tissue, and (ii) absorption of the first wavelength range by live human tissue satisfies a threshold condition;

one or more image acquisition devices that capture a first image of the first subject under illumination of the first wavelength range, and a second image of the first subject under illumination of the second wavelength range; and an image analysis engine comprising one or more processing devices, the image analysis engine programmed to:

calculate pixel-wise differences in intensity values between corresponding pixels of the first image and the second image, calculate an aggregated measure of the pixel-wise differences in intensity values, calculate a difference between the aggregated measure of the pixel-wise differences and a target value, identify, based at least on the difference between the aggregated measure and the target value, the first subject as an alternative representation of a live person, and prevent access to the secure system responsive to identifying the first subject as an alternative representation of a live person.

10. The system of claim 9, wherein the alternative representation of a live person comprises a photograph of the live person.

11. The system of claim 10, wherein the photograph is printed on paper, or presented on a display device.

12. The system of claim 9, wherein the first wavelength range includes 940 nm, and the second wavelength range includes 850 nm.

13. The system of claim 9, wherein the threshold condition is satisfied if a variation between (i) the absorption of the second wavelength range by live human tissue, and (ii) the absorption of the first wavelength range by live human tissue, is more than 40%.

14. The system of claim 9, wherein the aggregated measure of the pixel-wise differences in intensity values comprises an average of the pixel-wise differences in intensity values.

15. The system of claim 9, wherein identifying the first subject as the alternative representation comprises processing the first image and the second image using a machine learning process trained to discriminate between images of live persons and corresponding alternative representations of the live persons.

16. The system of claim 9, wherein:

the one or more illuminating sources
illuminate a second subject with electromagnetic radiation in the first wavelength range, and illuminate the second subject with electromagnetic radiation in the second wavelength range;

the one or more image acquisition devices
capture a third image of the second subject under illumination of the first wavelength range, and capture a fourth image of the second subject under illumination of the second wavelength range; and the image analysis engine is programmed to:
identify, based on a difference between the third image and the fourth image, the second subject as a live person, and responsive to identifying the second subject as a live person, initiate an authentication process for determining if the live person is authorized to access the secure system.

17. The system of claim 9, wherein the secure system comprises a user-interface disposed in a kiosk.

18. One or more non-transitory machine-readable storage devices encoded with instructions configured to cause one or more processing devices to execute operations comprising:

causing one or more light source arrays to illuminate a first subject with electromagnetic radiation in a first wavelength range;

receiving a first image of the first subject captured under illumination of the first wavelength range;

causing the one or more light source arrays to illuminate the first subject with electromagnetic radiation in a second wavelength range, wherein a difference between (i) absorption of the second wavelength range by live human tissue, and (ii) absorption of the first wavelength range by live human tissue satisfies a threshold condition;

receiving a second image of the first subject captured under illumination of the second wavelength range;

calculating pixel-wise differences in intensity values between corresponding pixels of the first image and the second image;

calculating an aggregated measure of the pixel-wise differences in intensity values;

calculating a difference between the aggregated measure of the pixel-wise differences and a target value; and identifying, based at least on the difference between the aggregated measure and the target value, the first subject as an alternative representation of a live person; and preventing access to a secure system responsive to identifying the first subject as an alternative representation of a live person.

* * * * *